United States Patent [19]
Khandhadia et al.

[11] Patent Number: 5,584,507
[45] Date of Patent: Dec. 17, 1996

[54] COATED FABRIC FOR REDUCING TOXICITY OF EFFLUENT GASES PRODUCED BY NONAZIDE GAS GENERANTS

[75] Inventors: Paresh S. Khandhadia, Rochester Hills; Daniel G. Zelenak, Orion Township, both of Mich.

[73] Assignee: Automotive Systems Laboratory, Inc., Farmington Hills, Mich.

[21] Appl. No.: 331,934

[22] Filed: Oct. 31, 1994

Related U.S. Application Data

[63] Continuation-in-part of Ser. No. 331,674, Oct. 31, 1994, abandoned.

[51] Int. Cl.⁶ ................................................. B60R 21/16
[52] U.S. Cl. ..................... 280/743.1; 428/285; 422/171
[58] Field of Search .......................... 280/728.17, 730.1, 280/729, 743.1, 738, 739, 740; 423/437 M, 247; 422/171; 428/262, 289, 285

[56] References Cited

U.S. PATENT DOCUMENTS

| | | | |
|---|---|---|---|
| Re. 29,410 | 9/1977 | Yoshino | 427/390 R |
| 3,702,049 | 11/1972 | Morris, Jr. | 55/278 |
| 3,797,854 | 3/1974 | Poole et al. | 280/150 AB |
| 3,901,747 | 8/1975 | Garner | 280/741 |
| 3,925,248 | 12/1975 | Moroni et al. | 252/428 |
| 4,021,275 | 5/1977 | Kishi et al. | 149/35 |
| 4,066,415 | 1/1978 | Kasama | 280/741 |
| 4,325,364 | 4/1982 | Evans | 128/201.13 |
| 4,411,023 | 10/1983 | Pinson | 2/7 |
| 4,539,021 | 9/1985 | Hager et al. | 55/97 |
| 4,540,625 | 9/1985 | Sherwood | 428/283 |
| 4,559,066 | 12/1985 | Hunter et al. | 55/274 |
| 4,572,178 | 2/1986 | Takase et al. | 128/205.27 |
| 4,637,383 | 1/1987 | Lopez | 128/201.25 |
| 4,983,192 | 1/1991 | von Blucher et al. | 55/387 |
| 5,038,768 | 8/1991 | McGoff et al. | 128/202.26 |
| 5,104,727 | 4/1992 | Wnenchak | 428/285 |
| 5,160,163 | 11/1992 | Castagner | 280/740 |
| 5,221,520 | 6/1993 | Cornwell | 422/122 |
| 5,275,433 | 1/1994 | Klober et al. | 280/741 |

FOREIGN PATENT DOCUMENTS

| | | | |
|---|---|---|---|
| 570098 | 11/1993 | European Pat. Off. | 280/743 R |
| 3235176 | 3/1984 | Germany | 280/728 R |
| 5-16752 | 1/1993 | Japan | 280/728 R |
| 2225291 | 5/1990 | United Kingdom | 280/743 R |

*Primary Examiner*—Karin L. Tyson

[57] ABSTRACT

Fabric coatings and methods reduce the toxicity of effluent gases produced by combustion of nonazide gas generating compositions used to inflate vehicle occupant restraint systems. Passing the effluent gases into a coating comprising an alkaline material reduces the concentration of toxic oxides of nitrogen therein. Further, passing the effluent gases into a coating comprising an oxidation catalyst reduces the concentration of carbon monoxide therein.

10 Claims, 1 Drawing Sheet

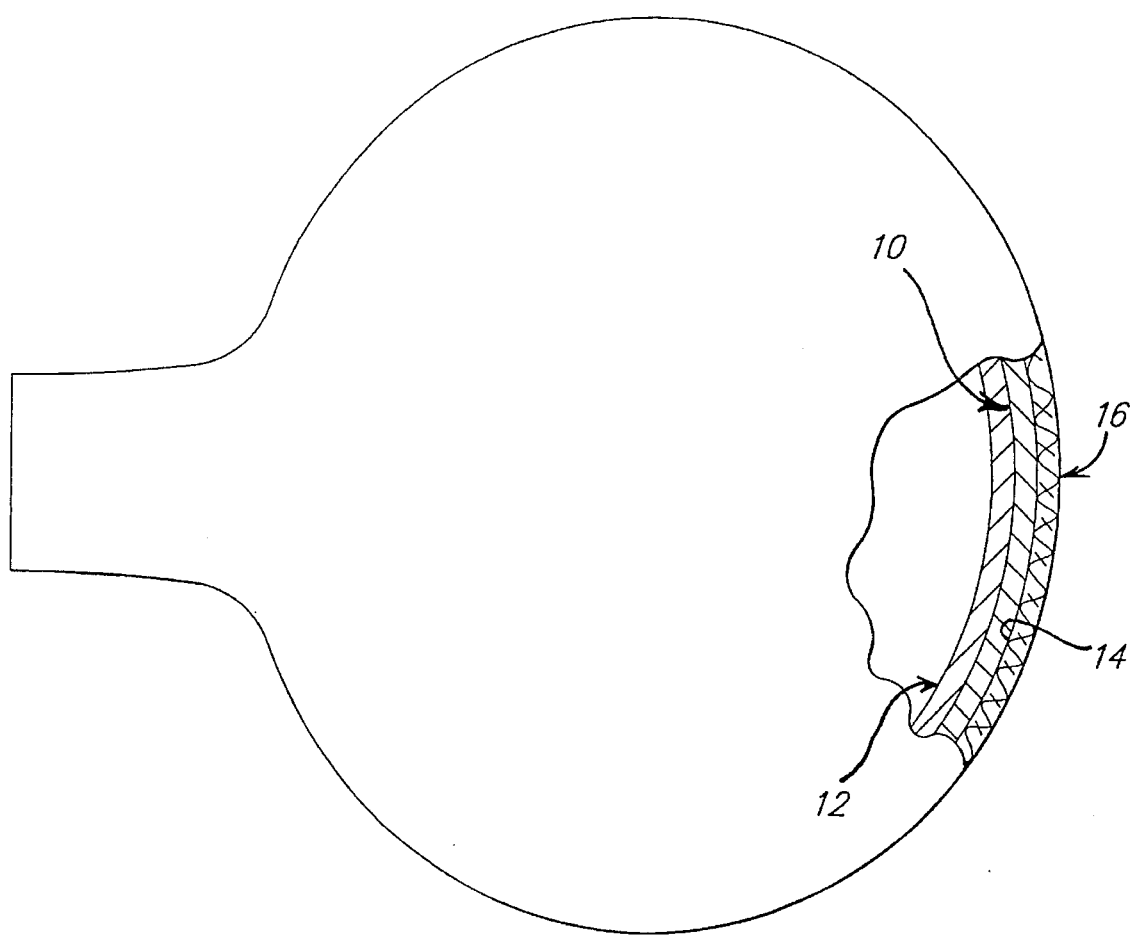

COATED FABRIC FOR REDUCING TOXICITY OF EFFLUENT GASES PRODUCED BY NONAZIDE GAS GENERANTS

CROSS REFERENCE TO RELATED APPLICATIONS

This application is a continuation-in-part of a U.S. patent application Ser. No. 08/331,674, filed on Oct. 31, 1994, now abandoned.

BACKGROUND OF THE INVENTION

The present invention relates generally to inflatable occupant safety restraints in motor vehicles, and more particularly to reducing the toxicity of effluent gases produced by nonazide gas generating compositions.

Inflatable occupant restraint devices for motor vehicles have been under development worldwide for many years, including the development of gas generating compositions for inflating such occupant restraints. Because the inflating gases produced by the gas generants must meet strict toxicity requirements, most, if not all, gas generants now in use are based on alkali or alkaline earth metal azides, particularly sodium azide. When reacted with an oxidizing agent, sodium azide forms a relatively nontoxic gas consisting primarily of nitrogen.

However, azide-based gas generants are inherently volatile to handle and entail relatively high risk in manufacture and disposal. More specifically, whereas the inflating gases produced by azide-based gas generants are relatively nontoxic, the metal azides themselves are conversely highly toxic, thereby resulting in extra expense and risk in gas generant manufacture, storage, and disposal. In addition to direct contamination of the environment, metal azides also readily react with acids and heavy metals to form extremely sensitive compounds that may spontaneously ignite or detonate.

In contradistinction, nonazide gas generants, such as those disclosed in U.S. Pat. No. 5,139,588 to Poole, typically comprise a nonazide fuel selected from the group of tetrazole compounds and metal salts thereof, and provide significant advantages over azide-based gas generants with respect to toxicity related hazards during manufacture and disposal. Moreover, most nonazide gas generant compositions typically supply a higher yield of gas (moles of gas per gram of gas generant) than conventional azide-based occupant restraint gas generants.

However, nonazide gas generants heretofore known and used produce high levels of toxic substances upon combustion. The most difficult toxic gases to control are the various oxides of nitrogen ($NO_x$) and carbon monoxide (CO).

Reduction of the level of toxic $NO_x$ and CO upon combustion of nonazide gas generants has proven to be a difficult problem. For instance, manipulation of the oxidizer/fuel ratio only reduces either the $NO_x$ or CO. More specifically, increasing the ratio of oxidizer to fuel minimizes the CO content upon combustion because the extra oxygen oxidizes the CO to carbon dioxide. Unfortunately, however, this approach results in increased amounts of $NO_x$. Alternatively, if the oxidizer/fuel ratio is lowered to eliminate excess oxygen and reduce the amount of $NO_x$ produced, increased amounts of CO are produced.

One way to improve the toxicity of the combustion gases is to reduce the combustion temperature which would reduce the initial concentrations of both CO and $NO_x$. Although simple in theory, it is difficult in practice to reduce the combustion temperature and to also retain a sufficiently high gas generant burn rate for practical application in an inflatable vehicle occupant restraint system. The burn rate of the gas generant is important to insure that the inflator will operate readily and properly. As a general rule, the burn rate of the gas generant decreases as the combustion temperature decreases. By using less energetic fuels, specifically fuels which produce less heat upon combustion, the combustion temperature may be reduced but the gas generant burn rate is also reduced.

Therefore, a need still exists for reducing the toxicity of effluent gases produced by nonazide gas generants without compromising the gas generant burn rate.

SUMMARY OF THE INVENTION

The aforesaid problems are solved, in accordance with the present invention, by a fabric which is specially coated to reduce the toxicity of effluent gases produced by upstream combustion of gas generating compositions used to inflate vehicle occupant restraint systems. A first coating comprises at least one alkaline material, for example, magnesium carbonate, sodium carbonate, calcium carbonate, calcium hydroxide, magnesium hydroxide, potassium hydroxide, and sodium hydroxide. As the effluent gases flow into the alkaline coated fabric, the concentration of $NO_x$ is reduced therein.

In further accordance with the present invention, a second fabric coating comprises at least one oxidation catalyst, for example, oxides of manganese, copper, cobalt, and silver, and HOPCALITE compounds. As the effluent gases flow into the oxidation catalyst coated fabric, the concentration of CO is reduced therein.

One or both coatings may be required, depending upon the relative concentrations of $NO_x$ and CO in the inflating gases. If both coatings are required, they may both be applied to a singular fabric, or alternatively, to separate fabrics if desired. In further accordance with the present invention, one or both coatings are applied to the air bag material itself.

BRIEF DESCRIPTION OF THE DRAWING

The FIGURE is a diagrammatic illustration of an inflatable air bag used in a vehicle occupant restraint system showing a partial cross section of a coated fabric in accordance with the present invention.

DETAILED DESCRIPTION OF THE PREFERRED EMBODIMENT(S)

In accordance with the present invention, a specially coated fabric is utilized to reduce the toxicity of combustion gases produced by nonazide gas generating compositions used to inflate vehicle occupant restraint systems, such as air bags. More specifically, one or more coatings are applied to the fabric in order to attenuate the concentrations of $NO_x$ and/or CO, which have heretofore been difficult to reduce without also undesirably decreasing the gas generant burn rate to insufficient levels.

In order to reduce the CO concentration present in effluent gases produced by the combustion of nonazide gas generants, a coating comprising one or more oxidation catalysts is applied to the fabric, in accordance with the present invention. By way of example, copper oxide, manganese dioxide, and particularly HOPCALITE compounds are oxidation catalysts that may be used in a fabric coating. HOPCALITE generally comprises mixtures of oxides of copper, cobalt, manganese and silver, and is typically formed by utilizing manganese dioxide and cupric oxide because of cost. Further, surface modified hopcalite is also available, and is less susceptible to moisture, thereby facilitating the use of a wash coating application process, as described hereinbelow. The oxidation catalyst coating effects a conversion of toxic CO to carbon dioxide ($CO_2$) by catalyzing a reaction of CO with oxygen gas ($O_2$), which is also present in the effluent gases.

Nonazide gas generants often also produce unacceptable levels of $NO_x$ upon combustion, for example nitrogen dioxide ($NO_2$), which is particularly toxic. In further accordance with the present invention, a coating comprising at least one alkaline material, for example, sodium carbonate ($Na_2CO_3$), magnesium carbonate ($MgCO_3$), calcium carbonate ($CaCO_3$), calcium hydroxide ($Ca(OH)_2$), magnesium hydroxide ($Mg(OH)_2$), potassium hydroxide (KOH), and sodium hydroxide (NaOH), is utilized to alleviate the excessive $NO_x$ concentration produced by the combustion of the nonazide gas generant. Specifically, the alkaline coating reacts in an acid-base manner with $NO_2$. For example, $Na_2CO_3$ in the alkaline coating reacts with $NO_2$ and water ($H_2O$), which is also present in the effluent gases, to form sodium nitrate ($NaNO_3$), $CO_2$, and hydrogen gas ($H_2$).

The alkaline coating may be used either in conjunction with the oxidation catalyst coating or as an alternative coating, depending upon the nature of the gas generating composition. For example, the components of the gas generating composition may already be manipulated to produce an acceptable level of CO but a higher level of $NO_x$, and in that situation, the oxidation catalyst coating would not be required whereas the alkaline coating would be required to reduce $NO_x$ concentration. On the other hand, the $NO_x$ concentration upon combustion may be acceptable while the CO concentration may be excessive, and thus the alkaline coating may be eliminated, but the oxidation catalyst coating would be required to reduce the CO concentration. In many nonazide gas generating compositions, however, both the $NO_x$ and CO concentrations are unacceptable, and both the oxidation catalyst coating and the alkaline coating are utilized. It is noted that each coating is preferably applied to a singular fabric, but separate fabrics for each coating may alternatively be used, if desired.

In further accordance with the present invention, as shown in the FIGURE (exaggerated in proportion for illustrative purposes), the oxidation catalyst coating 10 and/or the alkaline coating 12 is preferably applied to the inner surface 14 of the air bag material 16 itself. Incorporation of one or both coatings onto the air bag material itself is advantageous because of the peak "residence time" associated with the position of the bag during inflation, which may be as high as two or more seconds. Conversely, the "residence time" of placing a separate coated fabric near the gas generator may only be, for example, 60 milliseconds. Applying the coatings directly on the air bag material itself therefore facilitates the removal of $NO_x$ and/or CO because each coating has maximum time to operate by virtue of the peak "residence time."

The present invention is not limited by the types and variations of materials used as air bags. For example, the air bag may be formed from woven or nonwoven materials, including, but not limited to, polyethylene, polyester, and nylon. Further, the oxidation catalyst coating and the alkaline coating of the present invention may also be applied to porous uncoated bags, as well as to conventionally coated vented bags, which are already coated with other materials which enhance packing of the bag and weight reduction. The coatings of the present invention may also be applied to film type bag materials.

The present invention is not limited by the process of adhering each coating to the bag. The coatings may be applied, for example, by dip-coating, immersion, spraying, or a wash coating wherein surface modified HOPCALITE, for example, may be utilized as the oxidation catalyst. By way of example, 100 milligrams of the HOPCALITE oxidation catalyst for a driver's side air bag, and 200 milligrams of the HOPCALITE oxidation catalyst for a passenger's side air bag, is ground to a predetermined particle size, then suspended in a wash coat formulation, and then applied to the surface of a nonwoven polyester. The relative amounts of alkaline material used in the alkaline coating are similar.

While the preferred embodiment of the invention has been disclosed, it should be appreciated that the invention is susceptible of modification without departing from the scope of the following claims.

We claim:

1. A method of reducing toxicity in effluent gases produced by combustion of a gas generating composition used to inflate a vehicle occupant restraint device, wherein the gas generating composition comprises a nonazide fuel which produces toxic oxides of nitrogen and carbon monoxide upon combustion, said method comprising the steps of:

applying a first coating to a first fabric positioned downstream of the combustion reaction, said first coating comprising at least one alkaline composition which effects a reduction in the concentration of the toxic oxides of nitrogen present in said effluent gases;

applying a second coating to the first fabric, said second coating comprising an oxidation catalyst which effects a reduction in the concentration of the carbon monoxide in said effluent gases; and flowing the effluent gases into the coated first fabric.

2. The method of claim 1 wherein the alkaline composition is selected from the group consisting of sodium carbonate, magnesium carbonate, calcium carbonate, calcium hydroxide, magnesium hydroxide, potassium hydroxide, and sodium hydroxide.

3. The method of claim 1 wherein the oxidation catalyst is selected from the group consisting of oxides of copper, cobalt, manganese, and silver, and HOPCALITE compounds.

4. The method of claim 1 wherein the vehicle occupant restraint device comprises an air bag.

5. The method of claim 4 wherein the first fabric comprises the air bag material.

6. An air bag for use in a vehicle occupant restraint system which reduces levels of oxides of nitrogen and carbon monoxide in effluent gases produced by combustion of a nonazide gas generating composition used to inflate the air bag, said air bag having a fabric comprising:

a first coating comprising at least one alkaline composition which effects a reduction in the concentration of toxic oxides of nitrogen; and a second coating comprising an oxidation catalyst which effects a reduction in the concentration of carbon monoxide, wherein said fabric is positioned in the effluent flow path downstream of a gas generator containing the nonazide gas generating composition.

7. The air bag of claim 6 wherein the alkaline composition is selected from the group consisting of sodium carbonate, magnesium carbonate, calcium carbonate, calcium hydroxide, magnesium hydroxide, potassium hydroxide, and sodium hydroxide.

8. The air bag of claim 6 wherein the oxidation catalyst is selected from the group consisting of oxides of copper, cobalt, manganese and silver, and HOPCALITE compounds.

9. The air bag of claim 6 wherein said fabric comprises the material forming the air bag.

10. A method of reducing toxicity in effluent gases produced by combustion of a gas generating composition used to inflate a vehicle occupant restraint system, wherein the gas generating composition comprises a nonazide fuel which produces toxic oxides of nitrogen and carbon monoxide upon combustion, said method comprising the steps of:

applying a first coating to a first fabric positioned downstream of the combustion reaction, said first coating comprising at least one alkaline composition which effects a reduction in the concentration of the toxic oxides of nitrogen present in said effluent gases;

applying a second coating to a second fabric positioned downstream of the combustion reaction, said second coating comprising an oxidation catalyst which effects a reduction in the concentration of the carbon monoxide in said effluent gases; and flowing the effluent gases into the coated first and second fabrics.

* * * * *